Sept. 1, 1925.  
W. M. ROBERTS ET AL  
1,551,583
RECIPROCATING MACHINE AND PROCESS OF MOLDING
Original Filed Feb. 12, 1921    15 Sheets—Sheet 1
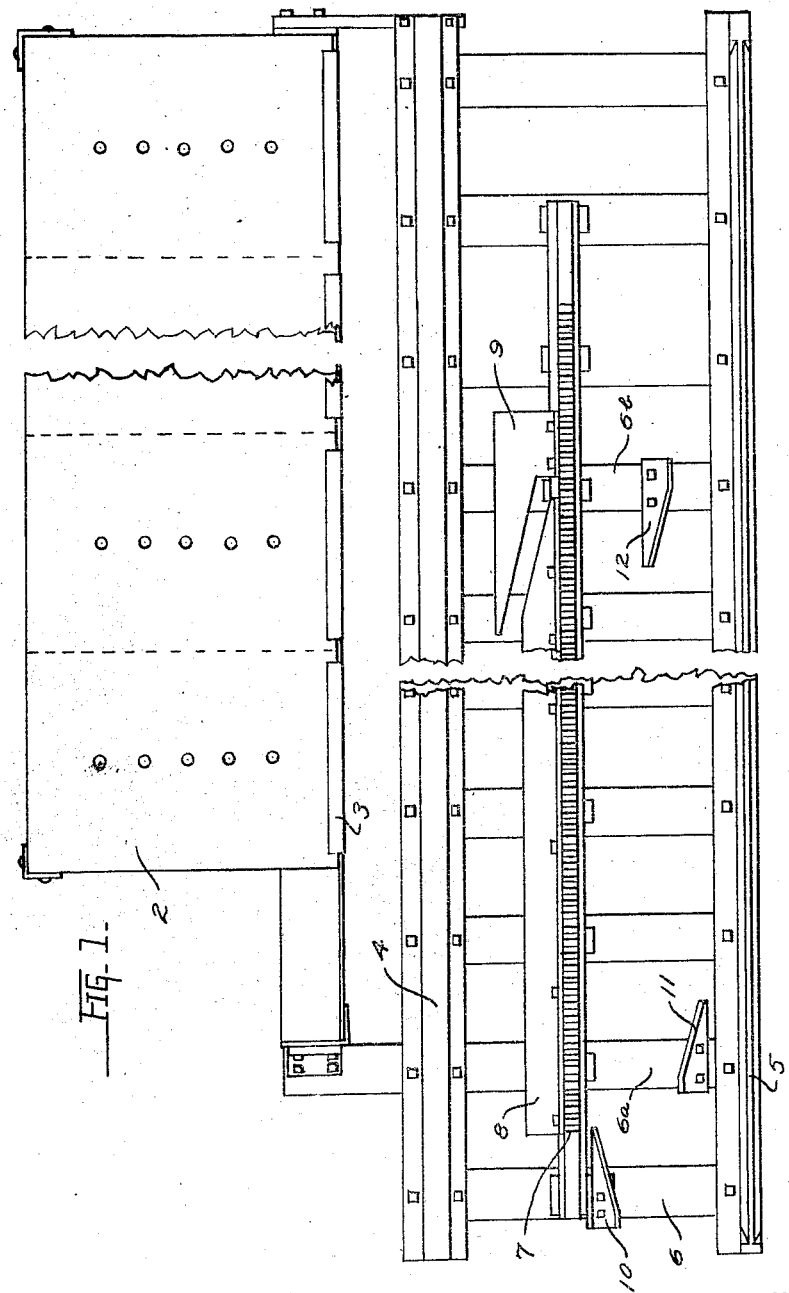

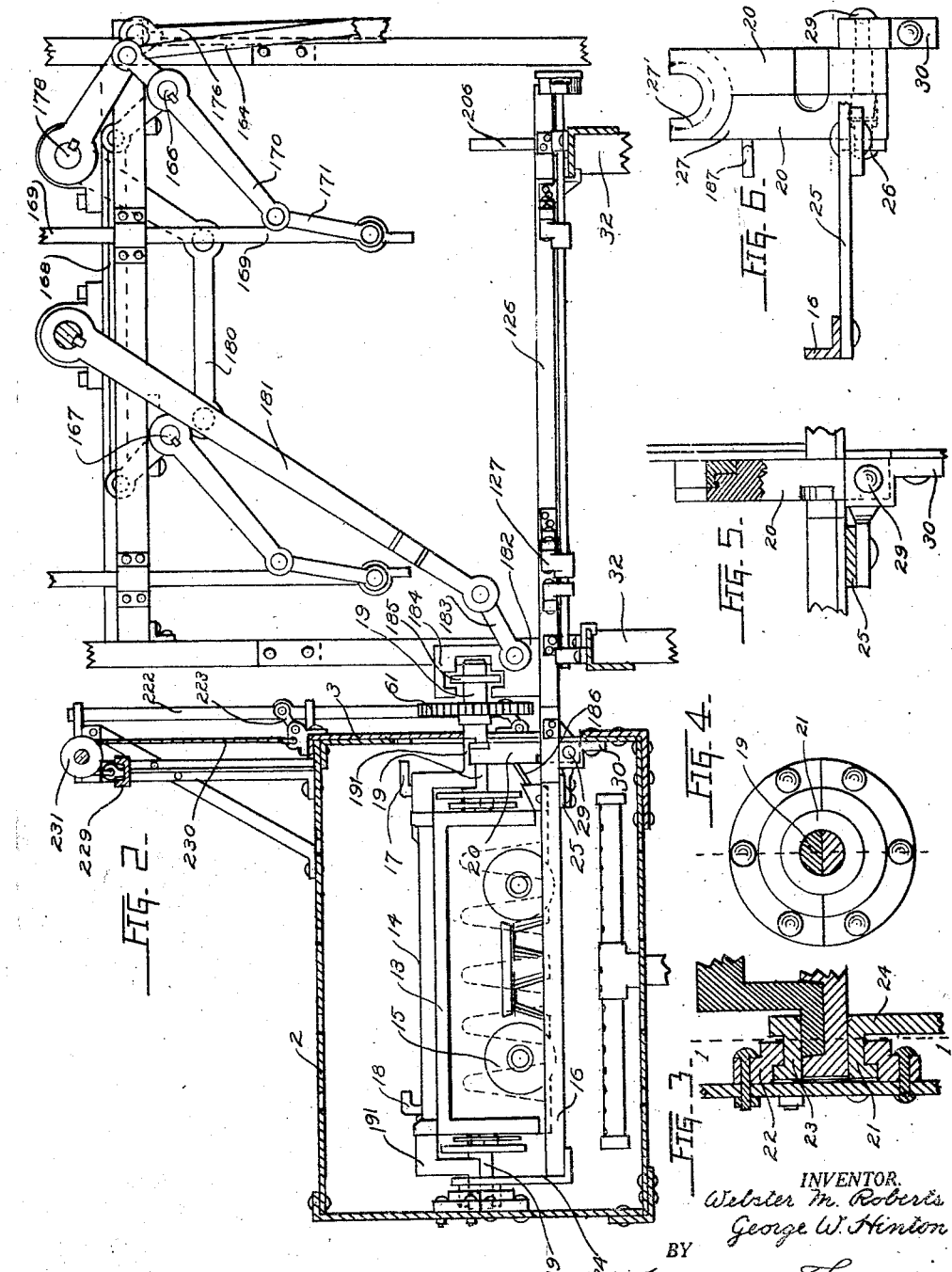

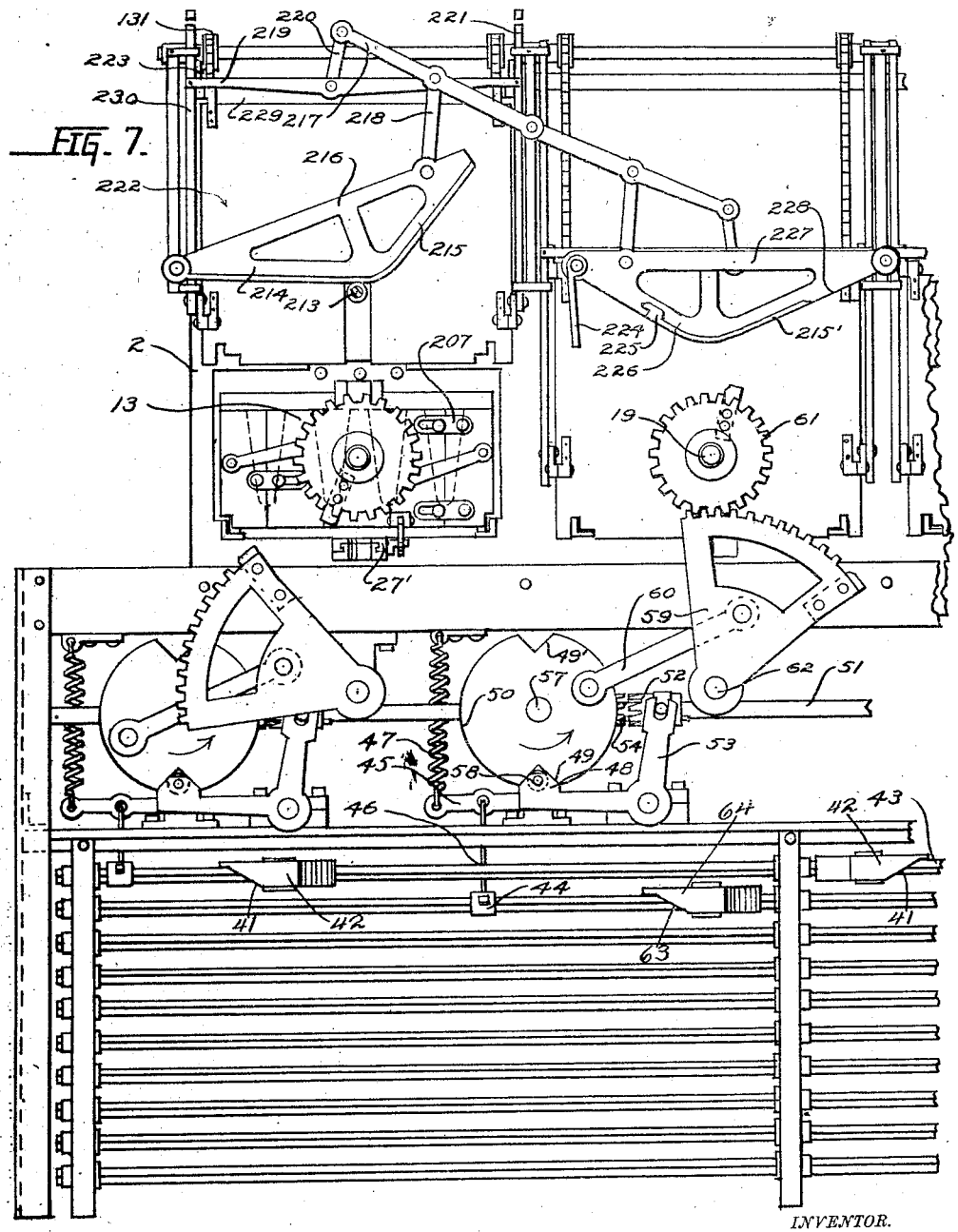

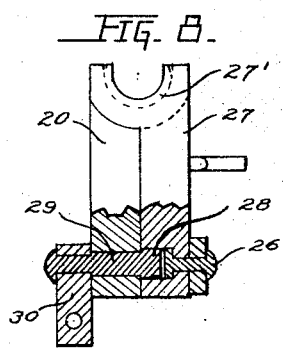
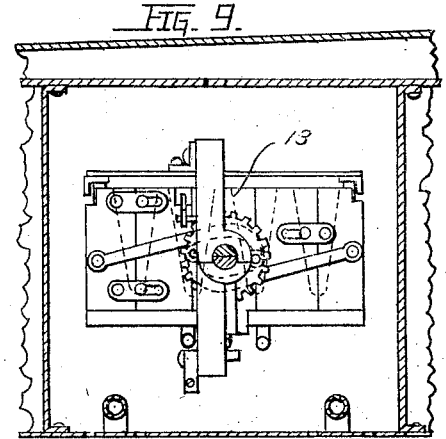
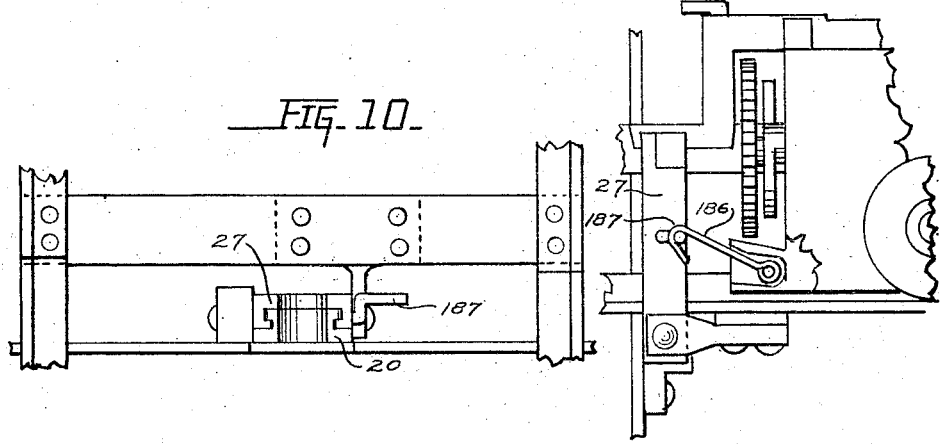
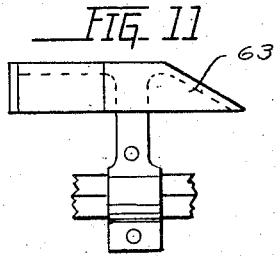
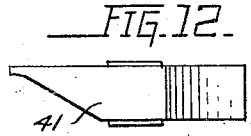
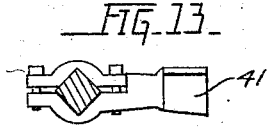

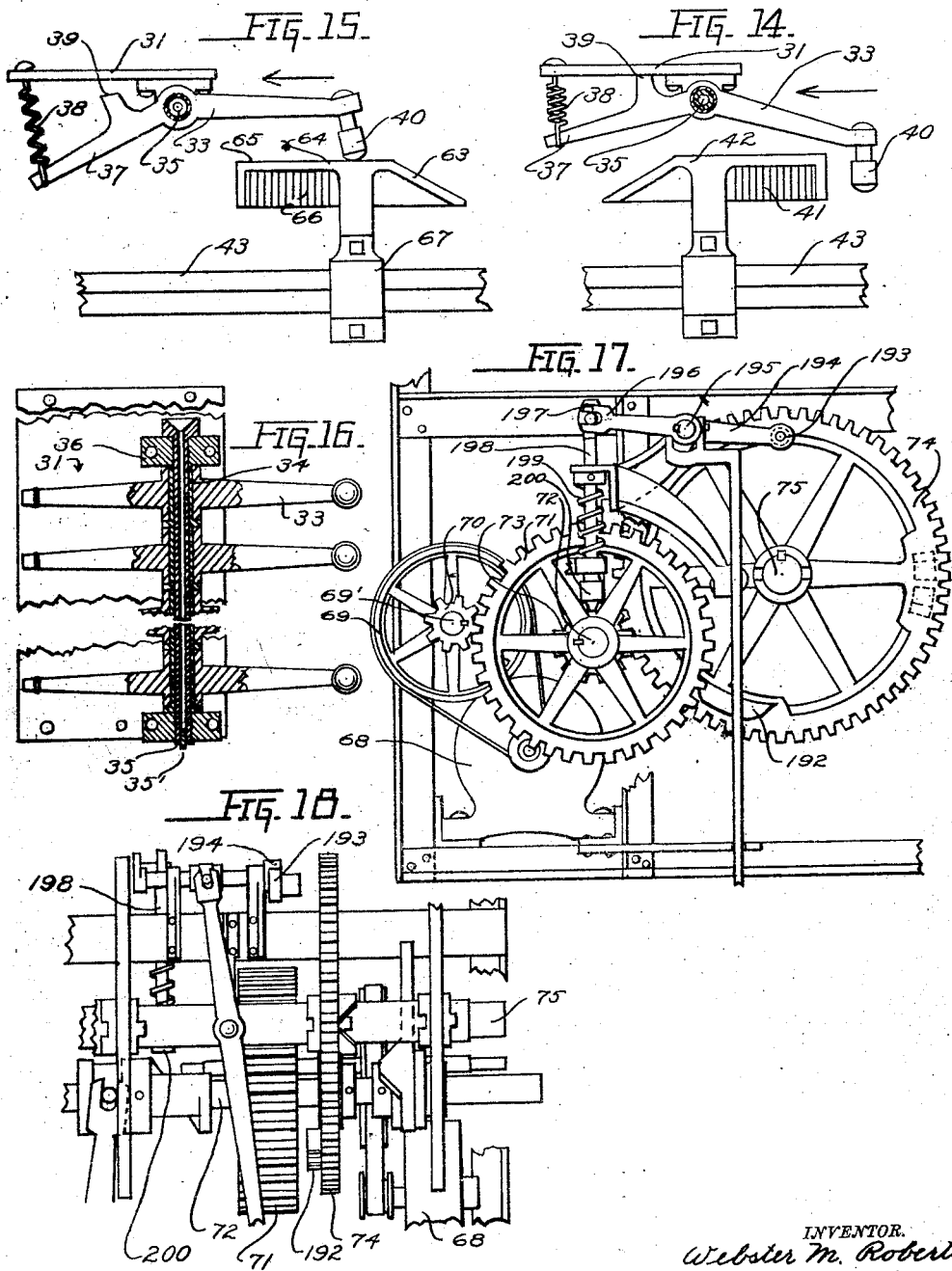

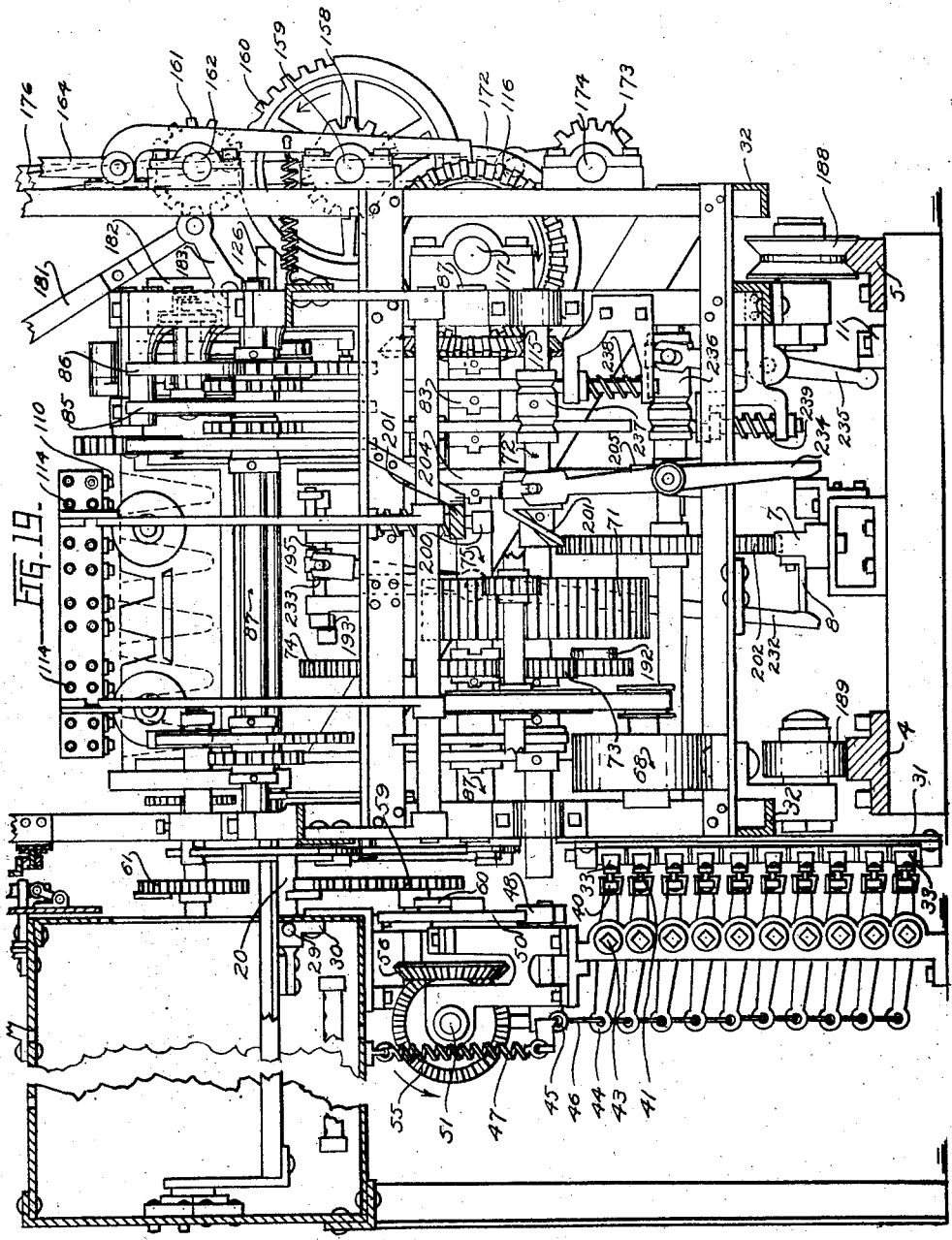

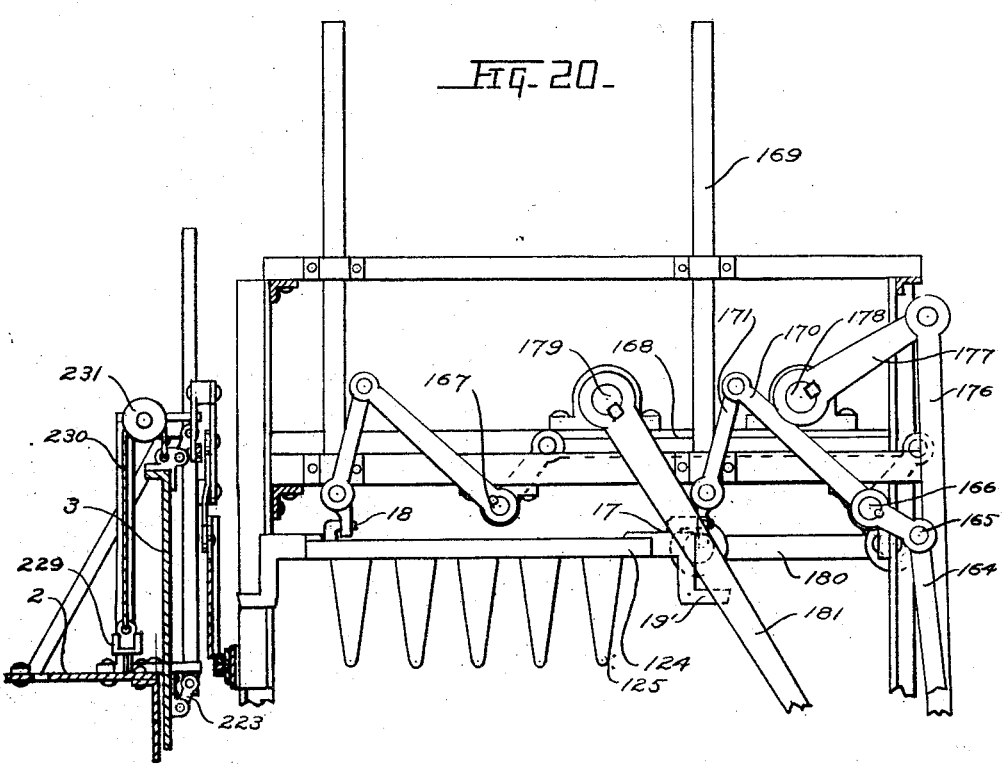
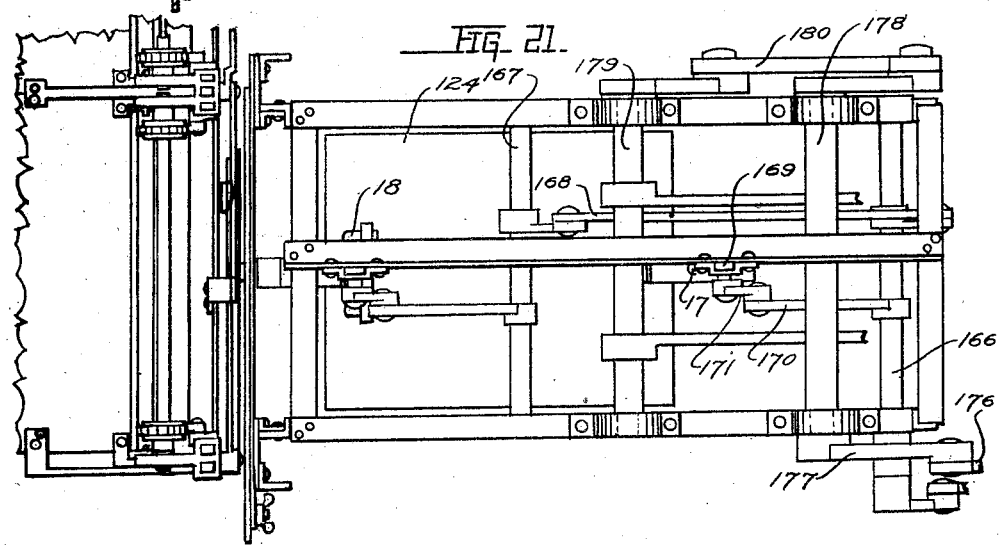

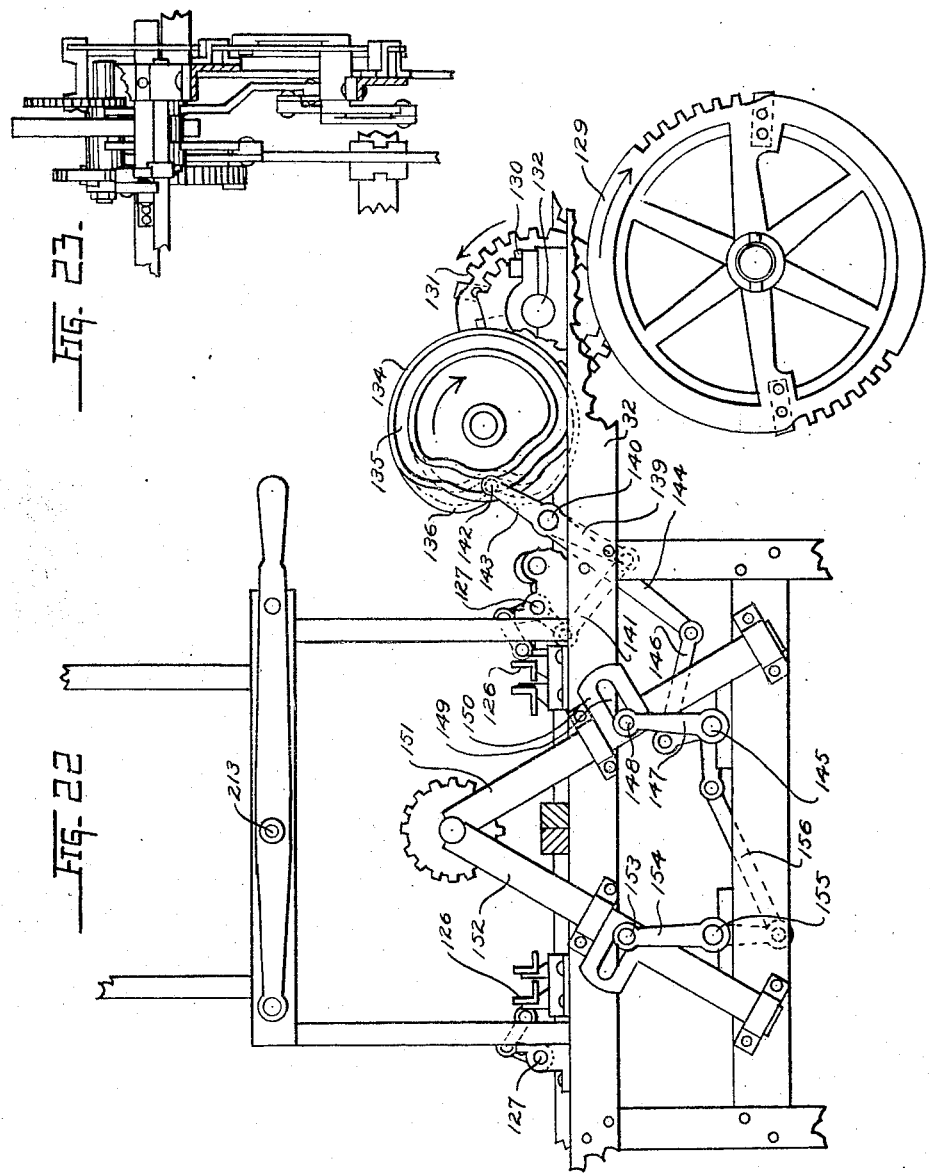

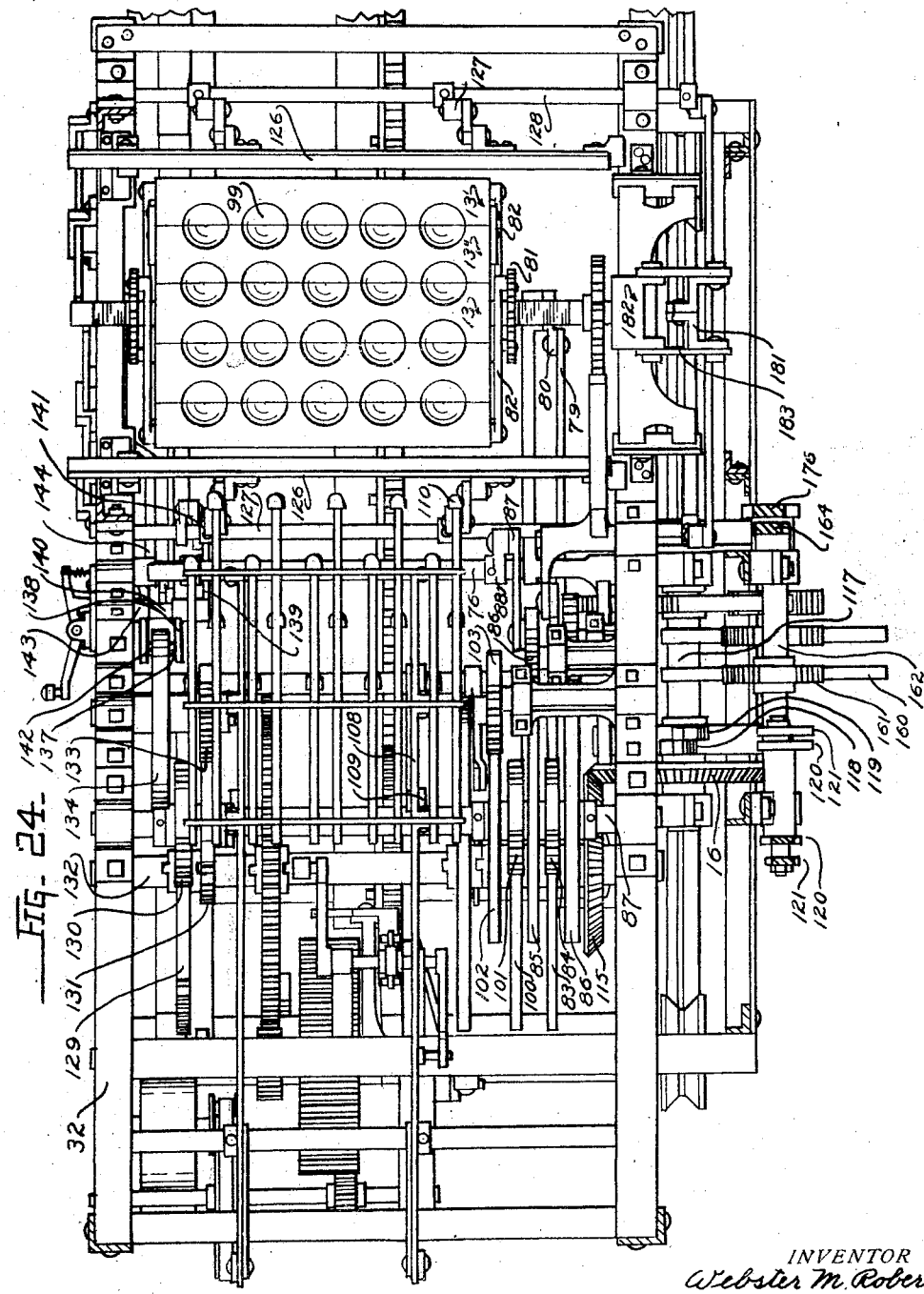

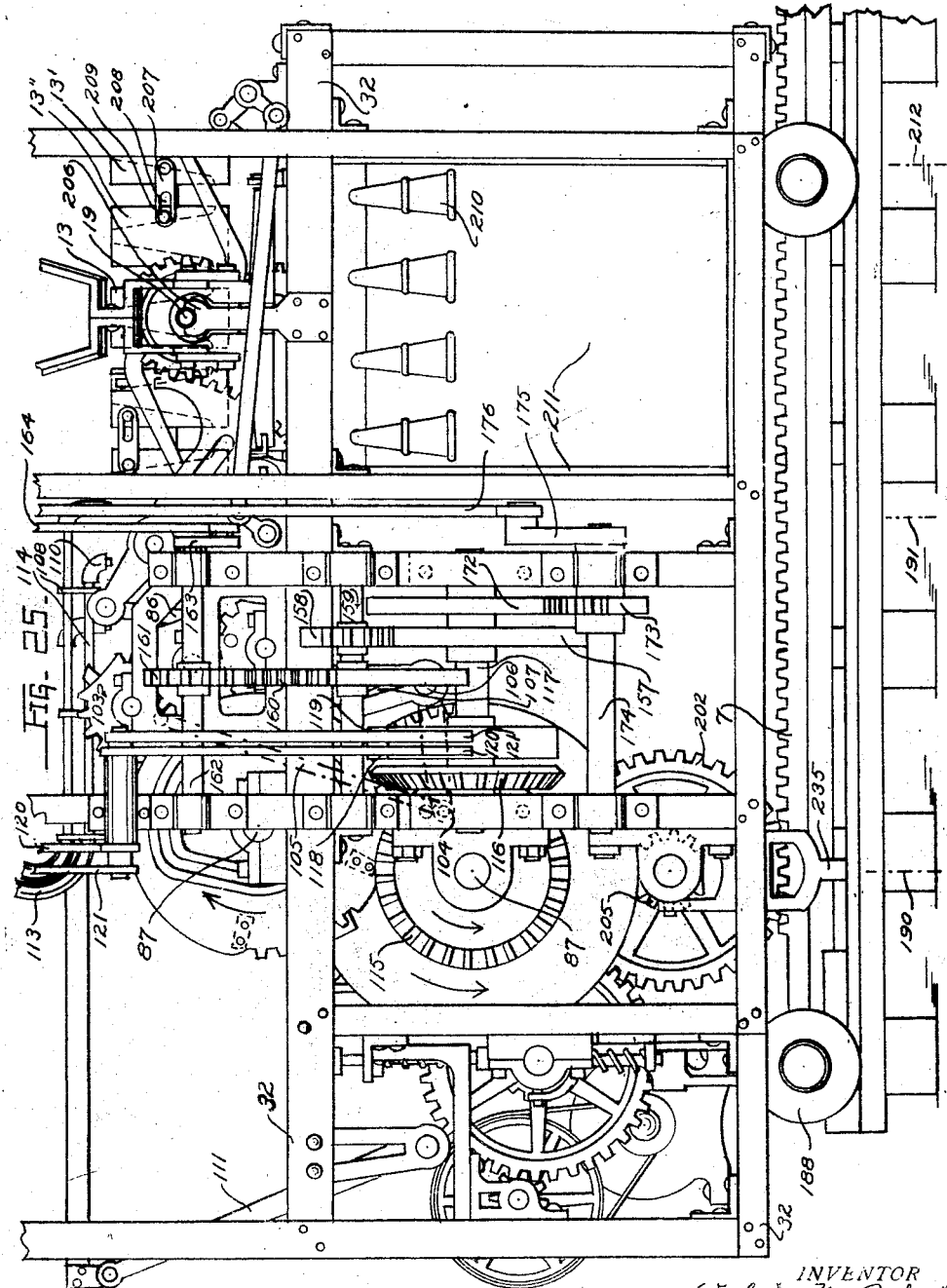

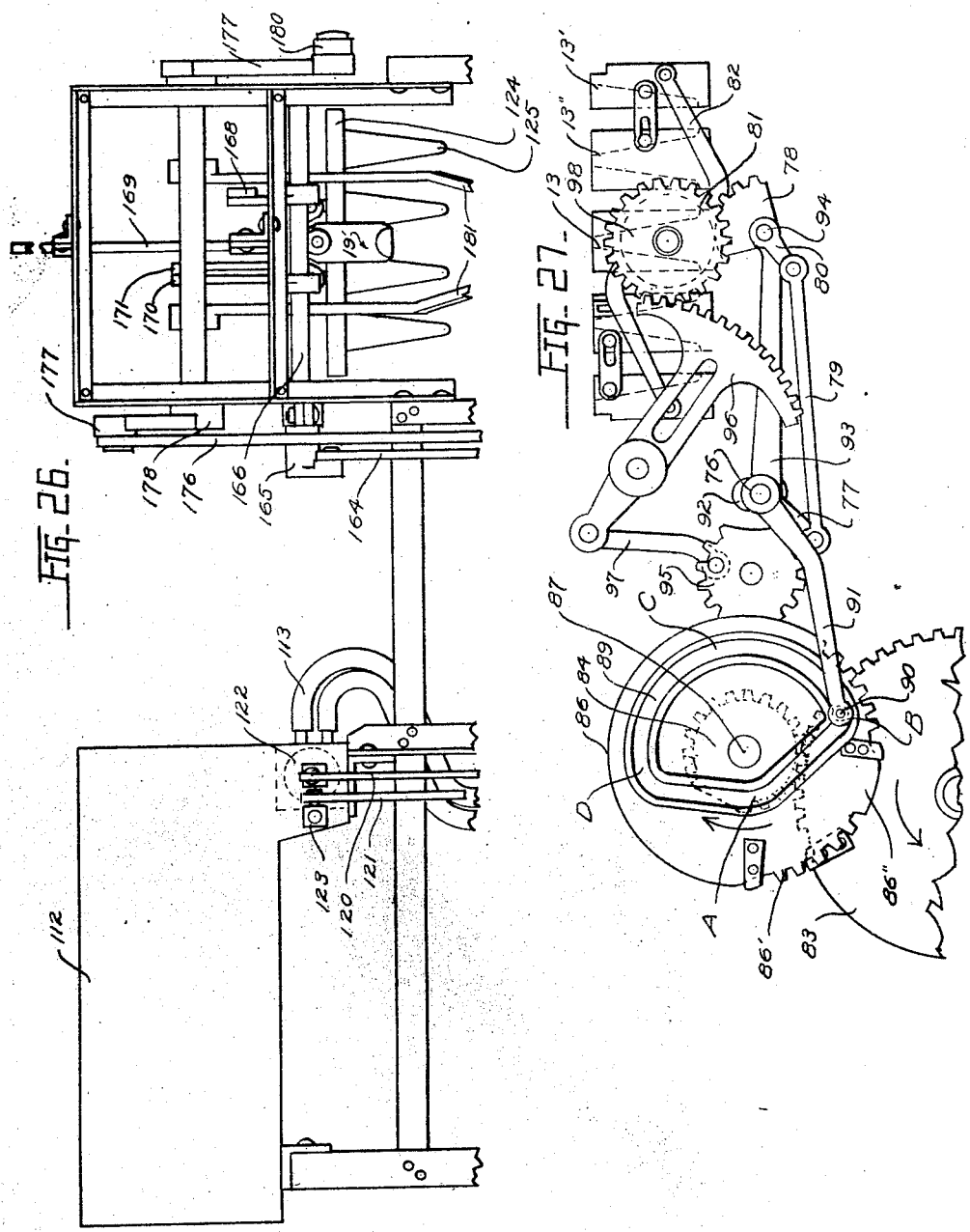

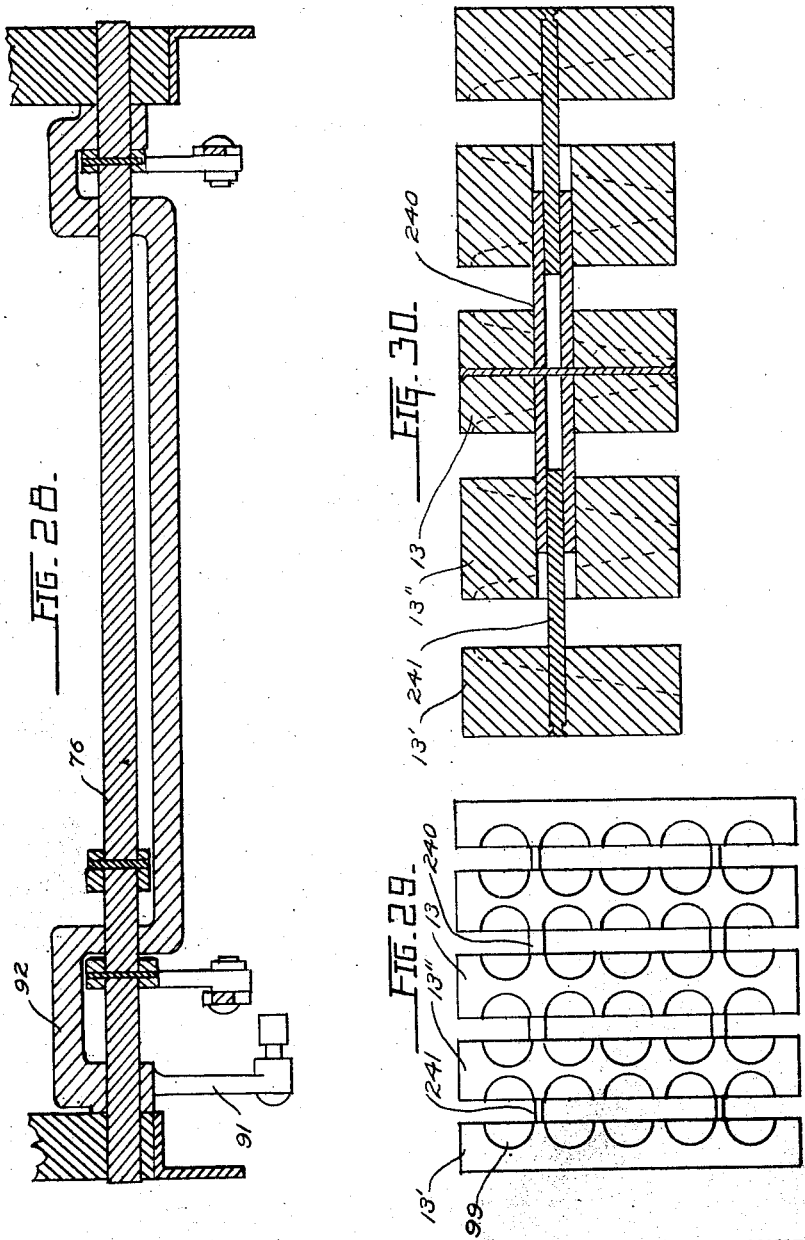

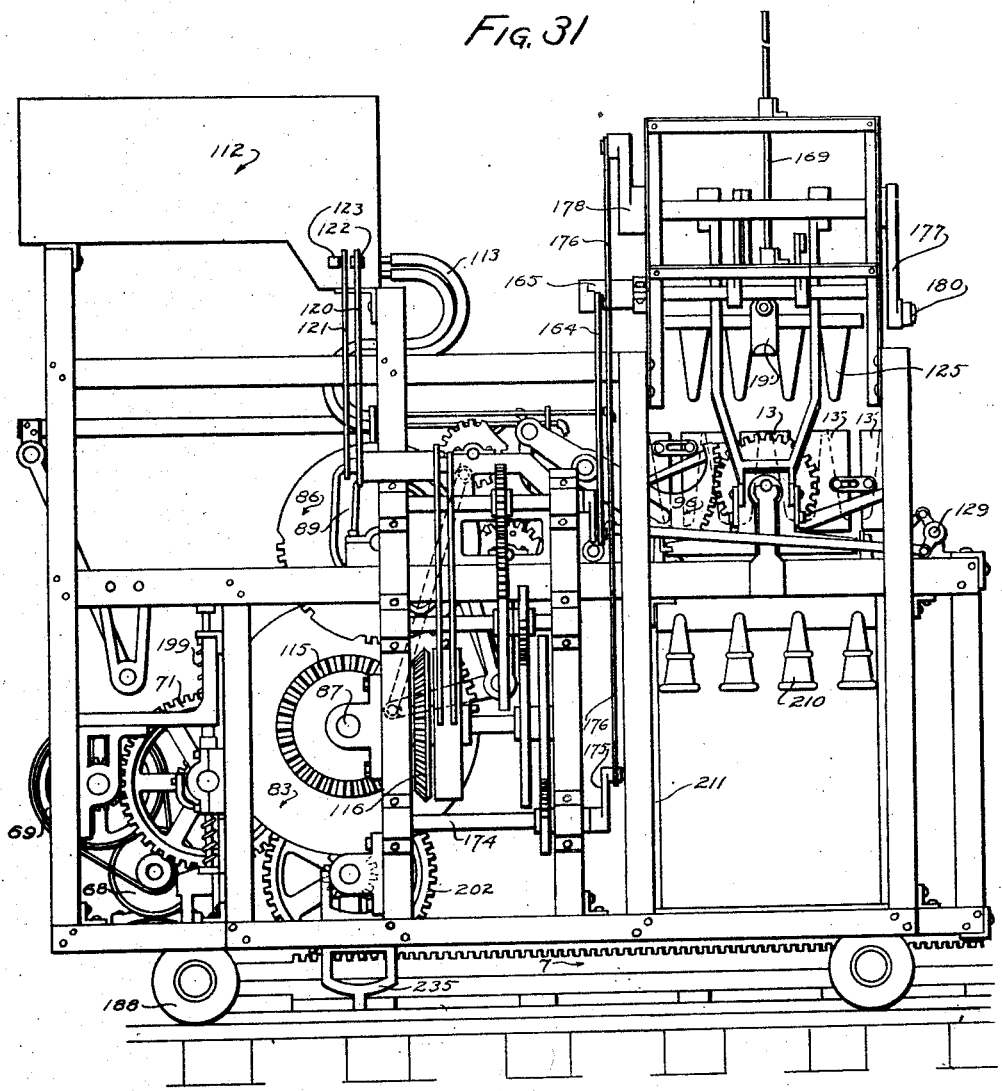

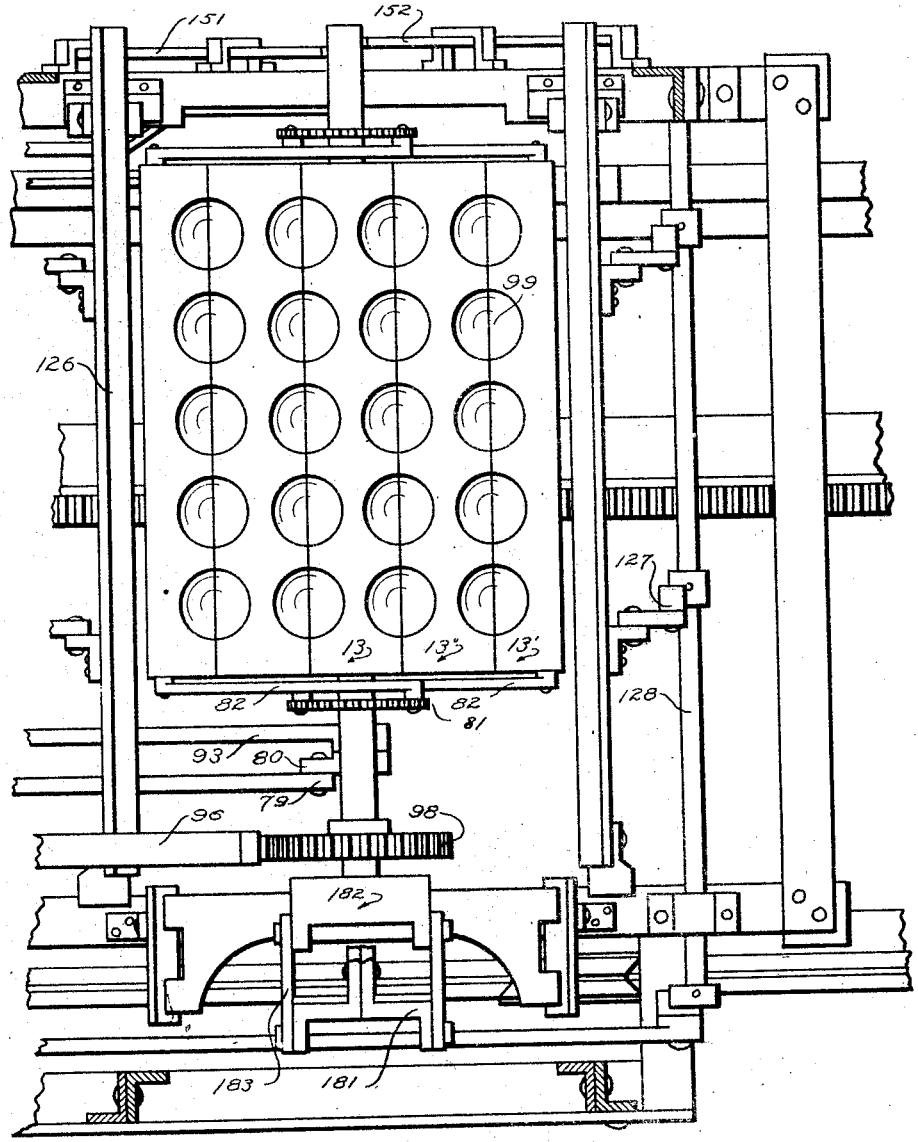

Sept. 1, 1925.

W. M. ROBERTS ET AL 1,551,583

RECIPROCATING MACHINE AND PROCESS OF MOLDING

Original Filed Feb. 12, 1921    15 Sheets-Sheet 15

INVENTOR
Webster M. Roberts
BY George W. Hinton
Soulmin & Soulmin
ATTORNEYS

Patented Sept. 1, 1925.

1,551,583

UNITED STATES PATENT OFFICE.

WEBSTER M. ROBERTS AND GEORGE W. HINTON, OF ST. JOSEPH, MISSOURI; MARY A. WILLIAMS (PUBLIC), ADMINISTRATOR OF THE SAID GEORGE W. HINTON, DECEASED, ASSIGNORS, BY DIRECT AND MESNE ASSIGNMENTS, TO ROBERTS CONE MANUFACTURING COMPANY, OF ST. JOSEPH, MISSOURI, A CORPORATION OF MISSOURI.

RECIPROCATING MACHINE AND PROCESS OF MOLDING.

Application filed February 12, 1921, Serial No. 444,460. Renewed February 9, 1925.

*To all whom it may concern:*

Be it known that WEBSTER M. ROBERTS and GEORGE W. HINTON, citizens of the United States, residing at St. Joseph, in the county of Buchanan and State of Missouri, have invented certain new and useful Improvements in Reciprocating Machines and Processes of Molding, of which the following is a specification, reference being had therein to the accompanying drawing.

Our invention relates to a machine and process of molding.

The object of our invention is to provide a machine for molding products which remain in a mold a predetermined time and are subject to heat treatment while in the molds. It is an object of our invention to provide a machine which will produce large numbers of molded articles in groups which may be seasoned or matured while other groups are being discharged or formed. It is an object of our invention to have a serving mechanism for a plurality of molding mechanisms. It is an object of our invention to provide a single machine for charging and discharging a plurality of separate molding mechanisms which will only necessitate one operator to attend to the machine which serves the plurality of individual molding units. It is an object of our invention to provide a machine that is entirely automatic, only requiring the attention of the operator to the extent of starting and stopping the machine at the beginning and end of the working shift and to the extent of keeping the tank of material to be molded properly charged. It is our object to provide a machine that otherwise, when functioning normally, will require no more attention on the part of the operator, who may, therefore, superintend at the same time other machines, thus materially saving labor costs.

Referring to the drawings:

Fig. 1, is a reduced diagrammatical top plan of the ovens and the track;

Fig. 2, is a side view of a set of molds in an oven, a portion of which oven is broken away;

Fig. 3, is a vertical section in detail of the rear trunnion bearing and of the rear mold trunnion, cut through the center of the parts;

Fig. 4, is a vertical section in detail of the parts seen in Figure 3, cut on the line 1—1, seen in Figure 3, looking toward the left;

Fig. 5, is a side view of the oscillatably mounted front trunnion-bearing, certain parts being broken away;

Fig. 6, is a rear view of the parts seen in Figure 5, looking toward the right;

Fig. 7, is a front view of the oven-door-operating mechanisms and of the mechanisms for inverting and reverting the molds while in their respective ovens;

Fig. 8, is a front view in detail of the trunnion bearing seen in Figures 5 and 6, certain parts being broken away;

Fig. 9, is a front view of a set of molds in inverted position, certain parts of the oven and of the heating devices being broken away;

Fig. 9ª is a side view in detail of the trunnion-bearing lifting-mechanism, certain parts being broken away;

Fig. 10, is a top view in detail of the front trunnion bearing and of the parts connected therewith;

Fig. 11, is an enlarged bottom view in detail of one of the trip treadles used in the mold inverting and reverting mechanism;

Fig. 12, is a front view of the parts seen in Figure 11;

Fig. 13, is an end view of the parts seen in Figure 11, looking toward the right;

Fig. 14, is a top view of the treadle seen in Figure 12 and embodies a similar view of the treadle oscillating mechanism ready for action;

Fig. 15, is a similar view of a treadle having faces oppositely inclined and of the treadle operating mechanism passing around said treadle;

Fig. 16, is a rear view in detail of a number of the treadle operating mechanisms, certain parts being broken away;

Fig. 17, is a front view in detail of the automatically operated carriage returning means;

Fig. 18, is a side view of the parts seen in Figure 17, looking toward the left;

Fig. 19, is a left end elevation of Figure 24;

Fig. 20, is a side view in detail of the upper portion of the mold-withdrawing and lid-lifting mechanisms and a sectional view of a door operating mechanism;

Fig. 21, is a top plan of the parts seen in Figure 20;

Fig. 22, is a rear view of the rear trunnion supports and of the rail spreading mechanism;

Fig. 23, is a side view of the parts seen in Figure 22, looking toward the right;

Fig. 24, is a top plan of a set of molds and of the mechanisms for serving the same, the upper portion of said parts being omitted;

Fig. 25, is a front view of the lower portion of the parts seen in Figure 24;

Fig. 26, is a view similar to Figure 25 of the upper portion of the mold serving mechanisms;

Fig. 27, is a front view in detail of the transportably mounted mold inverting and reverting mechanism and of the mold section spreading mechanism.

Figure 33:
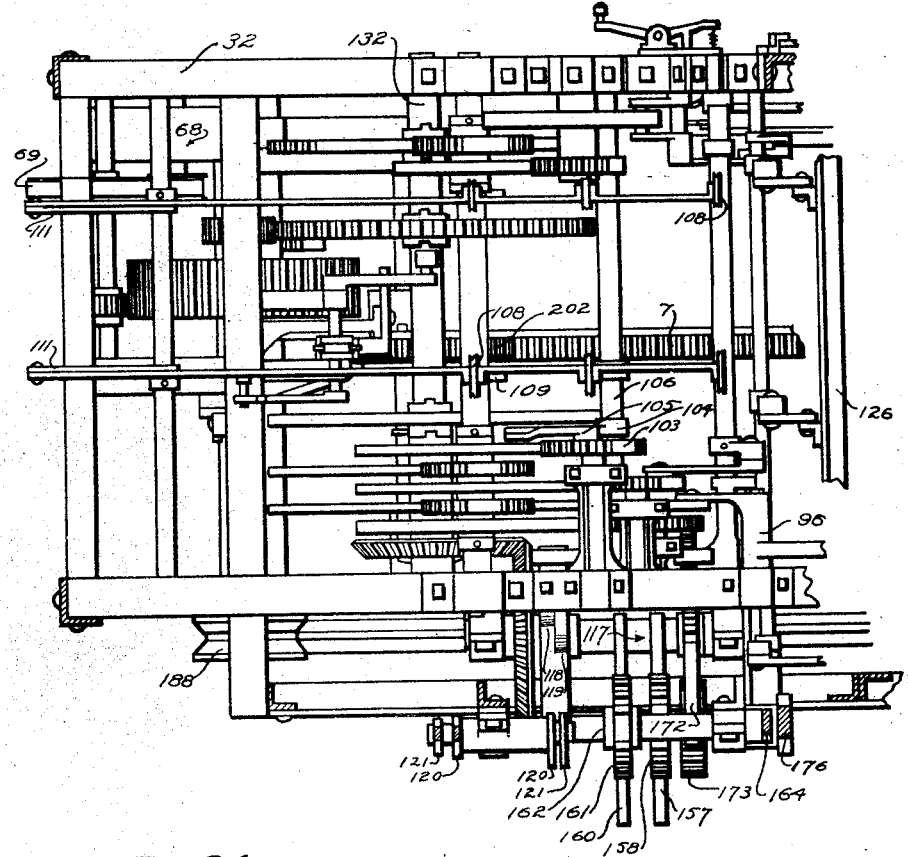
Figure 34:
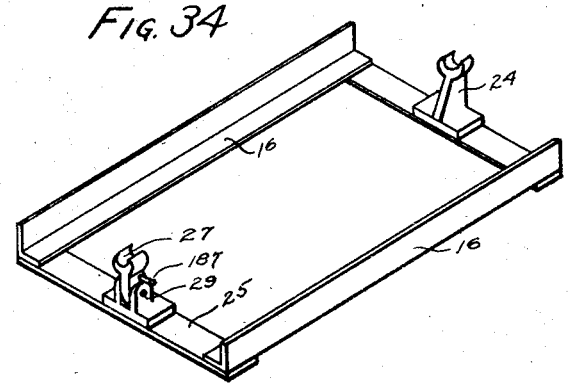

Fig. 28 is an enlarged vertical section in detail of the rock shafts, by which the mold spreading mechanism is operated;

Fig. 29, is a top plan view of the mold sections in spread position, showing portions of the section supporting means, said sections being inverted;

Fig. 30, is an enlarged vertical section in detail cut longitudinally through the mold-section supporting means;

Fig. 31, is an elevation of the complete machine;

Fig. 32, is an enlarged plan view of the molds on the right of Figure 24;

Fig. 33, is an enlarged view of the left hand half of Figure 24, showing in an enlarged plan the operating mechanism of the carriage with the mold material apparatus removed; and, Fig. 34, is a view of the oven rails and trunnions.

In general, the method of operation of the machine of our invention is as follows: We employ a carriage mechanism to travel back and forth on a track in order to serve a plurality of molding devices, each of which is located in an oven. The carriage stops before one of the ovens, lifts the door, removes the molding devices and slides them on the carriage, removes the cores, inverts the mold, opens the molds allowing the molded articles to gravitate therefrom onto an endless carriage; returns the molds to their closed upright position, loads the molds with an additional charge of material to be molded, inserts the cores and returns the completed molding unit into the oven and shuts the oven door. The carriage then moves forward to the next oven and having lifted the door of that oven repeats the operation. Sometimes after the carriage has moved, the loaded mold inside the oven behind the closed door is inverted.

Upon reaching the end of the series of ovens, the carriage automatically returns itself to the point on the track where it started and repeats the operation.

It will be observed that the machine will therefore operate as long as the power is on and as long as it has a charge of molding material in the tank carried by the carriage.

Referring to the specific steps in the operation of this machine, let it be assumed that the oven door is open of one of the ovens, and that the machine for serving the mold is in front of the oven door. At this stage the mold and core mechanism will be found in an upright position with the points of the molded articles down. This molding mechanism rests in the oven in an inverted position but is reverted while the carriage moves along the track prior to carriage stopping in front of the oven. The machine can be adjusted to throw the inverting and reverting mechanism into gear any time the carriage moves along the track from one position to another.

Step 1—The door of the oven is opened.

Step 2—The molds are drawn out of the oven onto the carriage. (See Figure 2)

Step 3—The cores and the cover to which the cores are attached are lifted (See Figs. 20 and 21)

Step 4—The trunnion supports are lifted and immediately after the rail sections on which the molds have rested on the carriage are spread. (See Figures 22 and 23).

Step 5—The mold sets are inverted by a counter-clockwise movement so that the molded articles may be dropped out on an endless carriage, the mold sections being opened at the same time that the inversion takes place. (See Figures 27, 25, 29 and 30).

Step 6—The mold sections are united and reverted; the rail sections on the carriage are drawn together, the trunnions are then lowered so that the mold unit will rest upon the rails. (See Figures 22 and 23).

Step 7—The molding material apparatus is extended over the open molds and the material discharged in the predetermined quantity in each of the molds. (See Figures 25 and 26).

Step 8—The mechanism in the preceding step is withdrawn. (See Figures 25 and 26, as well as 24).

Step 9—The cores are lowered into the molds. (See Figures 20 and 21)

Step 10—The complete molding apparatus is moved into the oven.

Step 11—The door is lowered. (See Figure 7)

Step 12—The carriage moves to the next oven having already lifted its door.

Step 13—The mold is inverted so that the points of the molded articles will be up. Set to operate any time the carriage moves from one position to another. (See Figure 7).

Referring to Figure 1, a battery of preferably ten ovens 2 is formed of sheet metal in one continuous line. Each one of the ovens is provided with a door, 3, in front of which the track rails 4 and 5 are secured on the cross ties 6 forming a track on which the hereinafter described carriage is mounted and reciprocated. The gear rack 7 is secured on the central portion of said ties. The cam plates 8 and 9 are secured on the rear edge portion of said rack. The cam plate 10 is secured on the tie 6. Cam plate 11 is secured on the cross tie which is adjacent to said tie 6 and designated 6ª. The cam plate 12 is secured on a more distant one of said cross ties at 6ᵇ. The functions of said cam plates and rack 7 will be hereinafter fully described.

Referring to Figure 2, the set of molds 13 is provided with the lid 14. Said set of molds are transportably mounted on the wheels 15 which rest upon the oven track 16. The lid is provided with a front lifting stud 17 and the two rear lifting studs 18, by which said lid and the connected parts are lifted from said set of molds. Trunnions 191, front and rear, are formed with the lid 14 on the upper half. The lower half portions 19 of said front and rear trunnions are formed with the set of molds. One of said trunnion portions is supported in the oscillatably mounted trunnion bearing 20, while the rear trunnion portion is supported in the oscillatably mounted sleeve 21, as seen in Figure 3.

Said sleeve is held against longitudinal movement in the rear bearing 22 by the flange 23 which is formed on the rear end of said sleeve. The sleeve and flange are mounted for oscillation in said rear bearing.

The upper ends of the suspending rods 24 (only one is shown), are united at their upper ends and are connected with said sleeve. The lower ends of said rods are connected with the rear end of the rails of the oven track 16. The front ends of said rails are provided with the cross tie 25, the central portion of which is oscillatably mounted on the pivot 26, as seen in Figures 6 and 8.

Referring to Figure 8, pivot 26 has a head formed on its inner end for holding the same against detachment from the trunnion-bearing member 27, which member has an aperture formed in alignment with pivot 26. Said aperture is oscillated onto the pivot boss 28 for holding the lower ends of said member and the bearing 20 in register with each other. The boss is formed on the master pivot 29 on which latter the lower end of the bearing 20 is oscillatably mounted. The end of the pivot 29 is secured in the block 30. This in turn is secured on the inner surface of the oven 2 beneath the central portion of its door 3. The bearing 20 and the bearing member 27 are held laterally against detachment from each other, at their upper ends by the flange 27', as seen in Figures 6 and 7.

Outward movement of the set of molds 13 when it is moved against the trunnion bearings and its bearing member, oscillates the latter from their positions as seen in Figures 2 and 6 to the position seen in Figure 19. Assuming that the set of molds have been charged with batter and returned into the oven 2, the set of molds is then inverted and reverted by the following described mechanism.

The tracks which support the mold in the oven are connected at each end with the bar which holds the track in proper relation to one another. At the center of the bar at each end of the tracks in the oven there is a trunnion which is so mounted as to support the molding devices consisting of the cores and molds at either end. This arrangement is in the nature of a cradle on which the mold rests while in the oven. (See Figure 34).

These trunnions in the oven do not raise and lower bodily in a vertical sense, nor do the rails spread in the oven, but it will be seen that in order to get the mold out of the oven onto the carrying mechanism, it will be necessary to move the front trunnion support out of the way. This is accomplished by pivoting the front trunnion at its lower end so that it can be turned from the vertical into the horizontal and the mold allowed to travel over it. When the mold travels over it, it remains in its horizontal position until the mold returns in the oven, when it is again elevated into its vertical position. (Figure 6 and Figure 9).

Bearing plate 31 (see Figure 19) is secured on the carriage 32 which is automatically moved step by step on the rails 4 and 5, carrying the bearing plate and the arms 33.

Referring to Figures 14 and 16, a plurality of arms 33, corresponding in number with the ten ovens and the like number of mold sets respectively therein, are alike in construction and operation, and therefore but one of said arms will be described in detail. Arm 33 is oscillatably mounted on the sleeve 34, the lower end of which sleeve is flanged outwardly for supporting said arm. Each sleeve rests upon the sleeve next below it. This sleeve is mounted to oscillate on the vertical shaft 35 which is mounted in the bearings 36. Said bearings are secured on the bearing plate 31. The shaft 35 is hollow and is provided with apertures leading therefrom for lubricating each one of the arms.

The lower end of the oil cavity is closed by the plug 35'. The arm 33 has the arm 37 formed therewith, the free end of which is actuated by the spring 38 to move 33 in the following described movement. The return movement is limited by contact of the stop 39 with the bearing plate 31. The free end of the arm 33 carries the friction roll 40 which, when passed beneath the inclined surface 41 of the treadle 42 lifts said treadle, thereby oscillating the treadle and the square shaft 43. The arm 44 (see Figures 14, 7 and 19) is secured on said treadle shaft, the free end of the arm being moved downwardly by this oscillation. The free end of the arm is connected with the trip arm 45 by the rod 46. Said downward movement of the free end of said arm similarly moves this rod and a portion of said trip arm, overcoming spring 47. This downward movement of the trip arm similarly carries the wedge shaped stop block 48 (see Figure 7) from a notch 49, formed in the stop disk 50.

Shaft 51 is provided with an electric motor or other similar means, (not shown) whereby said shaft is rotated counter clockwise as indicated in Figure 19. Shaft 51 and clutch member 52 (see Figure 7), which is slidably splined on the shaft 51 are thus rotated continually while the machine is in operation.

The shifter fork 53 is formed with the trip arm 45 and when the previously described disk releasing movement takes place, the shifter fork is thereby moved toward the left. This in turn moves the clutch member 52 into engagement with the clutch member 54, thereby rotating the bevel gear 55 (see Figure 19) which gear is in engagement with the bevel gear 56. This gear 56 is secured on the shaft 57 on the other end of which the stop disk 50 is mounted. This results in rotating said disk counter clockwise until the notch 49 is out of register with the block 48.

During the period of time in which these movements take place, the friction roll 40 passes from beneath the treadle 42. Thereupon the spring 47 moves the free end of the trip arm upward until the friction roll 58 is pressed against the peripheral surface of said disk.

The friction roll is rotatably mounted in the upper portion of the stop block 48 with the upper portion of the peripheral surface of said roll protruding beyond the upper edge of said block. This exposed portion of the surface of the roll is pressed against the peripheral surface of the disk 50 thereby resisting the action of the spring 47 and holding the clutch member 52 in engagement with the clutch member 54. This engagement is thus maintained until said disk is rotated one-half of a revolution; upon which the notch 49' is rotated into register with the stop block 48. At this juncture the spring 47 draws the free end of the trip arm 45 upward, thereby moving the stop block 48 into said notch and at the same time moving the shifter fork 53 toward the right until the clutch member 52 is moved from its engagement with the clutch member 54, as shown in Figure 7. This disengagement of of the clutch members releases the gear 55 from the driving means. At this juncture the disk is stopped in its rotation until again released and driven as hereinafter described. The gear segment 59 is connected by a rod and crank with the previously described disk by rod 60. Said gear segment is in engagement with the mold-driving gear 61 which gear is secured on the outer end portion of the mold trunnion 19. While the previously described movement of disk 50 is taking place, by its connecting rod 60, it oscillates said segment from its position on the right hand to the position of the segment which is seen at the left, thereby reverting the set of molds 13 from the position seen in Figure 9 to the position seen in Figure 7. The gear segment 59 is secured on the oscillatably mounted segment shaft 62.

Referring to Figures 14 and 15, the friction roll 40 is carried against the inclined vertical surface 63 of the treadle 64 which guides said friction roll from the position seen in Figure 14 to the position seen in Figure 15, thereby overcoming spring 38. The end of the stud on which said friction roll is mounted passes along the plane vertical surface 65 of treadle 64 until the friction roll 40 passes said treadle upon which the spring 38 moves the parts from the position seen in Figure 15, to the position seen in Figure 14. This movement of said friction roll toward the left causes said roll to pass around the treadle 64 without operating it.

When said friction roll is carried by said carriage 32 toward the right, through its return movement said roll passes beneath the inclined surface 66 of treadle 64, thereby lifting it and again engaging the previously described mold oscillating mechanism with said power driven shaft for inverting the set of molds 13.

It will be understood that the treadles 42 and 64 can be secured by the clamp plate 67 on the square shaft 43 to precede or succeed each other in the order named and at any desired points on said shaft.

Referring to Figures 17 and 19, the electric motor is connected to the driven mechanism by the pulley 69 which is secured on the countershaft 69'. Gear 70 is secured on the countershaft 69' and is in engagement with the gear drum 71 for continually rotating said drum and the shaft 72 on which said gear drum is secured while the cone making machine is in operation.

Pinion 73 is secured on said shaft and is normally in engagement with the drive gear 74 which gear is secured on the master shaft 75.

It will be understood that said drive gear and the master shaft make one complete revolution for each cycle of mold serving movements as hereinafter described. With the parts in the position shown in Figures 19 and 25, said parts rest in this position for one fifteenth of said cycle of movement, after which the rock shaft 76 is oscillated counterclockwise, thereby similarly moving the crank 77 which is connected with the gear segment 78 by the rod 79 and crank 80, as seen in Figure 27.

This movement of said segment rotates the indicated gear 81 clockwise. Said gear is connected with the outer mold sections 13' by the rods 82. This rotation of the gear moves said outer mold sections from the position seen in Figure 27 against the intermediate mold sections 13''. Continued rotation of said gear moves said outer section and intermediate section, until said sections are moved from the position seen in Figure 27 to the position seen in Figure 24. The ends of the rock shaft 76 are oscillatably mounted on carriage 32. Said oscillation of said shaft is actuated by the following described parts. Referring to Figures 24 and 19, the Geneva drive gear 83 is engaged with and intermittently rotates the Geneva pinion 84, which latter is formed with the intermediate Geneva gears 85 and 86. Said intermediate gears are mounted for rotation on the shaft 87, the ends of which shaft rest in bearings mounted on the carriage 32. The intermediate Geneva gear 85 is in engagement with and intermittently drives the Geneva pinion 86, one-half of a revolution at a time. Said pinion is connected with the shaft 76 by the rod 87 and the crank 88.

After these operations have taken place, the gear segment 78 is lowered from its described engagement by the following described mechanisms: The cam channel 89 is formed on the front face of the intermediate Geneva gear 86, seen in Figure 27. When the start is made, the point D in the cam channel is in register with the friction roll 90 which is rotatably mounted on the free end of the arm 91, the other end of said arm being connected with the bent rock shaft 92 (see Figure 28) which is oscillatably mounted on the shaft 76. Since the remaining portion of said segment lowering mechanism is made in duplicate for contracting each one of the ends of said mold sections but one set of lowering devices is described. Referring to Figure 27 one end of the arm 93 is connected with the rock shaft 92. The segment 78 is provided with a shaft 94 which is oscillatably mounted in the free end of said arm.

It will be understood that the previously described segment oscillating mechanisms are also used for raising said segments into engagement with their respective gears 81 and for oscillating said segments in the direction which is opposite to the one described, for moving the mold sections 13', 13'', from the position seen in Figure 24 to the position seen in Figure 27. This operation takes place prior to the previously described operations of said segments and mold sections.

The previously described operation of lowering the segment 78 is actuated by the movement of the point D in cam channel 89 from register with the friction roll 90, until point A is in register with said friction roll. At this juncture the Geneva pinion and the drive gear 83 are in such position that rotation of the pinion 84 is stopped. While the segment 78 is being lowered from the position seen in Figure 27 the gear teeth 86' are in engagement with the pinion 95, and rotates said pinion one-half of a revolution. Said pinion is connected with the oscillatably mounted gear segment 96 by the rod 97. This movement of said gear teeth and the pinion driven thereby lowers the end of said rod and thereby lowers the end of said segment. This raises the geared end of said segment, the teeth of which are in engagement with the gear 98.

This movement rotates the molds 13 clockwise from the position seen in Figure 27 to the position seen in Figure 7; upon the rotation of which the gear 95 and the intermediate gear 86 is stopped, with the face 86'' against one of the concaved faces of the pinion 95, with the set of molds 13 reverted to the position seen in Figure 24.

The mold cavities 99 are charged with the proper amount of batter for making a cone in each cavity, the charging of which is performed by the following described mechanism: The Geneva drive gear 100, shown in Figure 24, is in engagement with the Geneva pinion mounted for rotation on the shaft 87. Said intermediate gear engages the Geneva pinion 103 for intermittently rotating the latter one-half of a revolution at a time. The last mentioned pinion is connected with the free end of the rocker arm 104, the other end of said arm being secured on the rocker arm 104, by the rod 105, as indicated by dot and dash lines in Figure 25. The other end of said arm is connected with the oscillatably mounted rock shaft 106. While the gear pinion 103 is being rotated one-half of a revolution, the crank end of the rod 105 is thereby drawn upward, which similarly moves the free end of the arm 104, thereby oscillating the shaft 106 clockwise. This oscillation of said shaft similarly moves the arm 107 which is pivotally connected with the pipe carriage 108 as seen at 109 in Figure 24.

This movement carries the right end of said pipe carriage toward the right, thereby carrying the nozzles 110 over the mold cavities respectively. The rear end of said pipe carriage is supported on the oscillatably mounted arm 111. During the latter portion of the previously described reverting of the set of molds 13, the first portion of the nozzle movement takes place, and the latter portion of said nozzle movement takes place immediately thereafter, through one continuous movement of said nozzles.

Charging mechanism.

While the nozzles 110 are over the mold cavities 99 a charge of batter is moved from the batter tank 112 through the hose 113 (seen in Figures 26 and 25) through the pipes 114 and nozzles 110 into said mold cavities by the following described batter pumping mechanism. The bevel drive gear 115 is secured on the master shaft 87, and engages the bevel gear 116 for rotating the longitudinally arranged master shaft 117. Referring to Figure 24, the cams 118 and 119 are secured on said shaft, whereby the drive rods 120 and 121 are moved for operating the pump plungers 122 and the slide valve 123, respectively. Since said pumping mechanism may be of any kind now in use and forms no original element of this invention, further description of said pumping mechanism is deemed unnecessary.

After the mold cavities 99 are thus charged with batter, the previously described nozzle moving mechanism is again operated for removing the nozzles 110 from their position to the position seen in Figure 24.

After the nozzles are thus removed, the lid 124, together with the cores 125 (seen in Figure 26) is lowered onto the set of molds 13. During this lid movement, the rail operating and rear-trunnion support operating mechanisms are operated by the following described parts.

Core replacing means.

The slidably mounted rail sections 126 are slid toward each other until they are in register with the rails 16 seen in Figure 2. This is performed by the toggle members 127 which are secured on the oscillatively mounted rock shafts 128 best seen in Figure 24. The Geneva drive gear 129, seen best in Figure 22, is engaged with the intermediate Geneva drive gear 130 for rotating said gear one-half of a revolution at a time. Said intermediate gear is formed with the Geneva gear 131 said gears being rotatably mounted on the fixed stud shaft 132. Gear 131 is in engagement with the Geneva pinion 133 which is formed with the cam wheel 134 (seen in Figure 24).

Referring to Figure 22, the cam wheel 134 has the cam channel 135 formed on the rear face thereof, and the channel 136 is formed on its front face. Friction roll 137 (see Figure 24) is moved by the channel 136. Said friction roll is mounted on the free end of the arm 138 which is formed with the oppositely extended arm 139 (Figure 22). Said arms are oscillatably mounted on the stud shaft 140, the rear end of which is secured on the frame 32. The free end of arm 139 is connected with the shaft 127 by the rod 141. The previously described parts move the rail sections 126 toward each other in which position, by reason of the shape of the cam channel 136, said rail moving parts are held in position until rotation of the cam wheel is stopped.

The friction roll 142 is rotatably mounted on the free end of arm 143 and extends therefrom into the cam channel 135. Said arm is formed with the oppositely extended arm 144, the free end of which is connected with the rock shaft 145 by the rod 146, (as seen in Figure 22), whereby said shaft is oscillated clockwise. One end of arm 147 is secured on said shaft 145 while stud 148 is secured in the free end of said arm and extends therefrom into the slot 149 which is formed in the drive plate 150. The clockwise oscillation of shaft 145 similarly oscillates the arm 147 and the stud 148 which drives said plate and the connected trunnion-supporting member 151 downwardly toward the right. The opposed trunnion-supporting member 152 is moved downwardly toward the left at the same time by the stud 153 which is secured in the arm 154. The opposite end of said arm is secured on the rock shaft 155 which is connected for opposite movement with the shaft 145 by the rod 156.

During the time in which these movements of the rails and trunnion supports have been taking place, the lid 124, together with the cores 125, is lowered from the position seen in Figure 20 onto the set of molds 13 in the position seen in Figure 7, by the following described lid lowering mechanism.

The Geneva drive gear 157 (see Figure 25) is secured on the longitudinally disposed drive shaft 117, which drive gear engages the drive pinion 158 secured on the shaft 159. The intermediate Geneva gear 160 is secured on the last mentioned shaft and is in engagement with the Geneva pinion 161 secured on the crank shaft 162 for intermittently rotating said shaft one-half of a revolution at a time. Crank 163 is secured on shaft 162 connected by the rod 164 with the crank 165 as seen in Figure 26. Said crank is secured on one end of the shaft 166, seen in Figure 20, for oscillating the shaft 166 in both directions. Said shaft is connected with the shaft 167 by the rod 168 for similarly oscillating the last mentioned shaft.

Since the raising and lowering of the two lift bars 169 is performed by mechanisms of the same construction and operation but one mechanism will be described. The lift bar is connected with the free end of the arm 170 by the rod 171. The other end of the arm is secured on the shaft 166. The bar 169 has an eye formed in its lower end into which the lifting stud 17 is passed by movement of said lid from the oven 2. The lower end of the undesignated lift bar is provided with two apertures formed therethrough into which the studs 18 are similarly carried. The movements of said parts by the previously described mechanisms lowers said lift bars from the position seen in Figure 20 to the position seen in Figure 2, thereby lowering the lid 124 and the cores 125 to the previously described position.

After these lid lowering movements have taken place, the set of molds 13 and the lowered lid are moved from the position seen in Figure 24, to the position seen in Figure 2, by the following mold moving means. The Geneva drive gear 172 is secured on the drive shaft 117 and engages the pinion 173 for intermittently driving said pinion one-half of a revolution at a time. Said pinion is secured on the crank shaft 174 on the end of which the crank 175 is secured. This crank 175 is connected by rod 176 with the crank 177 secured on one end of the shaft 178. This shaft 178 is connected with the mold moving arm shaft 179 by the connecting rod 180. The upper end of the mold moving arm 181 is connected with the slidably mounted block 182 by the links 183, as shown in Figs. 2 and 24.

Referring to Figure 2, the open side of the slot 184 is formed in said block, which slot engages the annular flange 185 for moving the trunnion 19 and the connected parts from the position seen in Figure 24 to the position seen in Figure 2, and vice versa. While the greater portion of said mold movements are taking place, the set of molds 13 pass over the front trunnion bearing 20, which lies in the position seen in Figure 19. During the latter part of said movement the hook 186 engages the stud 187 and thereby oscillates the trunnion bearing 20 from the position seen in Figure 19 to the position seen in Figure 2. Said stud is secured in the bearing member 27 as seen in Figure 6.

The molds are drawn from the position seen in Figure 2 to the position seen in Figure 24 by the next movement of the previously described mold moving mechanism. The Geneva drive gear 204 is secured on the master shaft 75 and at this juncture the teeth of said gear (see Figure 19), engage the teeth of the pinion 205 (see Figure 25) thereby rotating the gear 202 one-half of a revolution. The last mentioned gear is in engagement with the rack 7 and moves the carriage 32 and the mold serving mechanisms on said carriage from the dotted line 190 one step to the dotted line 191, after which the teeth of said drive gear pass out of engagement with the teeth of the Geneva pinion 205, thereby stopping the carriage movement, until after another cycle of movements of the mold serving parts has been performed.

At this point, the previously described mold moving mechanism by reason of its Geneva gears is again operated thereby turning the crank 175 one-half of a revolution from its described position to the position seen in Figure 25. This movement of the crank 175 drives the previously described mold moving mechanism whereby the second set of molds 13 is drawn from its oven from the position seen in Figure 2 to the position seen in Figure 24. Toward the end of this operation the front end of the trunnion 19 is passed onto the outer trunnion support 206, the lower end of which is secured on the carriage 32. It will be seen in Figures 25 and 2 that the outer edge portion of the trunnion end is inclined, which slightly raises said trunnion end and the therewith connected parts when the last described movement of the set of molds 13 takes place.

At this point, the previously described trunnion supports 151 and 152 are raised from their lowered position to the position seen in Figure 22, by their connecting mechanism. Immediately following this the rail moving mechanism for moving the rail sections 126 is moved, thereby moving said rail sections outwardly from register with the rails 16 to the position shown in Figure 22. While this rail movement takes place, the lid studs 17 and 18 are moved into the apertures which are formed in the lower ends of the lift bars 169, respectively. At this point the previously described lid lowering mechanism, (by reason of its Geneva gear operation) lifts said bars from the position seen in Figure 2 to the position seen in Figure 20, thereby lifting the lid 124. After the lid is thus lifted the mold reverting mechanism is again operated by its Geneva gears, inverting said molds from the position seen in Figure 2 to the position seen in Figure 19.

After said molds 13 are inverted they are spread from the position seen in Figure 24 to the position seen in Figure 25. In this operation, the outward movement of the sections 13' is continued until the links 207 are moved from the position seen in Figure 7 to the position seen in Figure 25. The inner ends of the slots 208, which are formed in said links, are drawn against the studs 209 thereby similarly moving the mold sections 13'', during the latter part of the movement of the mold sections 13'. This movement of the mold sections opens the cavities 99 into halves (Figures 24 and 29) thereby releasing the baked cones 210, which gravitate (Figure 25) onto the inclined chute 211, from which the molded articles gravitate onto any suitable carrying device, such as an endless belt.

After these operations have taken place, the mold serving operations are repeated, which operations end with the return of said set of molds into its respective oven 2. Then the carriage is again moved from the dot and dash line 191 to the dot and dash line 212, after which the third set of molds is served by the mold serving mechanisms as previously described. As said carriage passes from the dotted line 190 to the dotted line 191, the stud 213 (see Figure 22) is thereby carried from the position shown in Figure 7 from beneath the flange 214 to a point beneath the inclined flange 215. These flanges are formed on the lower edge of the oscillatably mounted arm 216. The free end of the arm is connected with the intermediate portion of the oscillatably mounted arm 217 by the rod 218. The free end of the arm 217 is connected with the door lifting bar 219 by the rod 220. The ends of the bar are secured on the slidably mounted bars 221, which bars are connected with the door 222, by the links 223 (Figure 2).

Referring to Figure 7, while the friction roll 213 is moving still further past the door 222, the arm 215 and the parts connected with it gravitate from the position indicated at the left to the position of similar parts seen at the right. The friction roll is still further moved against the gate 224 thereby closing said gate until its free end is stopped against the lug 225. The friction roll is moved against the inclined gate and the inclined surface 226 of the arm 227 thereby raising the right end of said arm, which by rod, crank and arm connections previously described, raises the undesignated door 3.

At this juncture the stud 213 is beneath the lowest portion of the arm 227. After these operations of lowering and raising said doors have been performed, the previously described mold serving operations take place, for serving the set of molds obscured from view in the undesignated oven 2 and the inclined flange 215'. The upper portion of said flange terminates with a space 228 between the flange and the free end of the arm 227. Each of the doors on the remaining ovens are provided with the last described form of arm.

Referring to Figures 2 and 20, each one of the doors 3 is provided with a counterbalance weight 229, which is slidably mounted for vertical movement. Said weight is connected with the upper end of doors 3 by the sprocket chains 230, which pass over the sprocket wheels 231.

It will be understood that said weight is not sufficient to fully counterbalance the weight of the door 3 and its connected parts which permits said door and said parts to slowly gravitate, for closing an oven 2 as previously described while the carriage 32 is being moved, step by step. The lower end of the shift lever 232 is held in the position illustrated by the cam plate 8 until the lower end of said lever reaches the cam plate 9, (Figure 1) by which latter plate the lower end of said lever is moved from the position shown in Figure 19 to a position closer to the gear rack 7. This movement of the shift lever (which is oscillatably mounted) moves the shifter fork 233 (Fig. 19) toward the left which movement similarly moves the rock shaft 195. This movement of the rock shaft carries the friction roll 193 into the path of travel of the cam plate 192 (Figure 17). This shifting movement of the friction roll takes place at the end of the last one of the previously described step by step movements of the carriage 32.

Said cam plate is secured on the master drive gear 74, and at the end of its succeeding movement of one cycle, carries said cam plate beneath the friction roll 193, thereby raising said roll and upwardly oscillating the arm 194, which similarly oscillates the shaft 195. The arm 196 is secured on the front end of said shaft. The shift for 197 is formed of the free end of said arm and engages the rod 198. This oscillating movement of the shaft 195 moves said arm and fork downward, thereby similarly moving the rod 198, overcoming the spring 199. The friction roll 200 is rotatably mounted on the lower end of said rod. This movement of said friction roll and the rod by which it is carried, moves said friction roll into the path of travel of the worm thread 201, which latter is secured on the shaft 75 as seen in Fig. 19.

Since the shaft 75 is continually rotated, while the machine is in operation, said worm thread is thereby rotated against said friction roll, thereby moving said worm thread, the shaft 75, the carriage drum gear 71, and the gear pinion 73 toward the right, until said pinion is carried out of engagement from the gear wheel 74, after which said drum gear is carried into engagement with the gear 202, thereby moving the lower end of the shifter fork 234 toward the rack 7. The last mentioned gear is at all times in engagement with the rack 7, and thereby drives the carriage 32 toward the left for return movement of said carriage to the beginning of its previously described step by step movement, into the position shown in Fig. 25.

During the first part of its returned movement said carriage 32 carries the lower end of the lever 232 from the cam plate 9 against the cam plate 8 (Figure 1) which, by the previously described shifting mechanism, moves the friction roll 193 out of the path of travel of the cam plate 192, leaving the return gear mechanism in engagement until said carriage is nearly at the beginning of its step by step movement.

At this juncture the cam plate 10 (see Figures 1 and 19) moves the lower end of the shifter fork 234 from its described position to the position seen in Figure 19, thereby shifting the shaft 75, the carriage worm thread 201, drum gear 71, and the pinion 73 toward the left to the position shown in Figure 19. At the end of the previously described step by step movement, the lower end of the oscillatably mounted shifter fork 235 is moved from the position shown in Figure 19 to a position closer to the rail 5. This shifting is performed when the lower end of the shifter fork is carried along the inclined face of the cam plate 12 (Fig. 1). The shifter fork moves the slidably splined shifter collar 236 and the Geneva pinion 205 toward the left from engagement with its drive gear 204.

As the carriage approaches the end of the returned movement, the lower end of the shifter fork 235 passes along the inclined face of the cam plate 11 thereby moving the end of the shifter fork from its described position to the position seen in Figure 19. Shaft 72 is provided with the grooved collar 237 secured thereon which collar is provided with the yieldable holding means 238 whereby the shaft 72, and the secured parts are yieldably held in either one of their two previously described positions.

The collar 236 and the pinion 205 are slid toward the right by the shifter fork 235 to move the Geneva pinion 205 from its described position to the position seen in Fig. 19, into engagment with its Geneva drive gear 204. Collar 236 is provided with grooves formed therein which are engaged by the yieldable holding means 239 for yieldably holding the collar and the pinion 205 in either one of its two positions.

Referring to Figures 30 and 29, the sleeve 240 is secured in the central section 13 of the set of molds and extends therefrom into the intermediate mold sections 13'', for supporting the section which is slidable on the extended portion of the sleeve. The outermost section 13'' is provided with the rod 241, the outer end of which rod is secured in the outer mold section. The inner end portion of the rod is slidably mounted in the outer end portion of the sleeve which provides supporting means for the intermediate and outer mold sections.

*Method of operation and process.*

As set forth in the first part of this specification, the process practiced by us in our invention is to load and unload in succession a plurality of molding devices, operating each of these molding devices to unload them and load them while the remainder of the molding devices are being heat treated in their respective ovens. When the whole series has been treated we move the loading and unloading mechanism back to the starting point and repeat the operation. This permits of the articles being molded to be treated a predetermined amount of time in a predetermined way, thus securing by our process not only a large quantity of molded articles but articles of a uniform quality and kind.

Having thus fully described our invention, what we claim as new and desire to secure by Letters Patent, is:—

1. In combination, a plurality of molding means, a reciprocating means, a loading means carried thereby, an unloading means carried on said reciprocating means, and means for moving each of said molding means on and off of said reciprocating means.

2. In combination, a plurality of molding means, a baking means, a reciprocating means, a loading means carried thereby, an unloading means carried on said reciprocating means, and means for moving each of said molding means on and off of said reciprocating means, and in and out of said baking means.

3. In combination, a plurality of molding means, a reciprocating means, a loading means carried thereby, an unloading means carried on said reciprocating means, means for moving each of said molding means on and off of said reciprocating means, and means to move the carriage step by step.

4. In combination, a plurality of molding means, a reciprocating means, a loading means carried thereby, an unloading means carried on said reciprocating means, means for moving each of said molding means on and off of said reciprocating means, and means to return to initial position said reciprocating means.

5. In combination, a plurality of ovens, molding devices normally contained therein, a reciprocating carriage adapted to be moved into association with each of said ovens in turn, loading means for said molding devices carried on said carriage and adapted to move the molding devices onto and off of said carriage, unloading means to remove the molded articles from said molding devices, means to automatically move said carriage step by step adjacent to each of said ovens in succession and means to automatically return said carriage to its initial position, whereby articles are molded.

6. In combination, a plurality of ovens, molding devices normally contained therein, a reciprocating carriage adapted to be moved adjacent each of said ovens in turn, loading means for said molding devices carried on said carriage, unloading means to remove the molded articles from said molding devices, means to move said carriage step by step adjacent to each of said ovens in succession, means to return said carriage to its initial position, and means to insert and withdraw said molding devices in said oven at stated intervals, whereby articles are molded.

7. In combination, a plurality of ovens, molding devices normally contained therein, a reciprocating carriage adapted to be moved adjacent each of said ovens in turn, loading means for said molding devices carried on said carriage, unloading means to remove the molded articles from said molding devices, means to move said carriage step by step adjacent to each of said ovens in succession, means to return said carriage to its initial position, means to insert and withdraw said molding devices in said oven at stated intervals, and means to invert and revert said molding devices while in said oven, whereby articles are molded.

8. In combination, a plurality of ovens, molding devices normally contained therein, a reciprocating carriage adapted to be moved adjacent each of said ovens in turn, loading means for said molding devices carried on said carriage, means to move said carriage step by step adjacent to each of said ovens in succession, means to return said carriage to its initial position, means to insert and withdraw said molding devices in said oven at stated intervals, means to invert and revert said molding devices while in said oven, and means to invert and revert said molding devices while on said carriage, whereby articles are molded.

9. In combination, a plurality of ovens, molding devices normally contained therein, a reciprocating carriage adapted to be moved adjacent each of said ovens in turn, loading means for said molding devices carried on said carriage, unloading means to remove the molded articles from said molding devices, means to move said carriage step by step adjacent to each of said ovens in succession, means to return said carriage to its initial position, means to insert and withdraw said molding devices in said oven at stated intervals, means to invert and revert said molding devices while in said ovens, and means to open and close the doors of said ovens, and doors for each of said ovens.

10. In combination, a plurality of ovens, a plurality of molding devices therein, carriage mechanism adapted to cooperate with each of said ovens and molding devices in succession, doors for each of said ovens, means on said carriage for opening the door of each of said ovens and closing said doors, means for removing each of the molding devices from said ovens onto said carriage and returning said molding devices to said ovens, means of removing molded articles from said molding devices while on said carriage, and means of refilling said molding devices while on said carriage, whereby molded articles are made.

11. In combination, a plurality of ovens, a plurality of molding devices therein, carriage mechanism adapted to cooperate with each of said ovens and molding devices in succession, doors for each of said ovens, means on said carriage for opening the door of each of said ovens and closing said doors, means for removing each of the molding devices from said ovens onto said carriage and returning said molding devices to said ovens, means of removing molded articles from said molding devices while on said carriage, means of re-filling said molding devices while on said carriage, and means of removing said molded articles when removed from the molding devices, so that the molded articles can be carried away from the carriage, whereby molded articles are made.

12. In combination, a plurality of ovens, a door to each oven, a molding device in each oven consisting of a plurality of molds and a plurality of cores, carriage mechanism adapted to be brought adjacent each of said ovens successively, means of moving said carriage step by step, means of returning said carriage to its initial position, means on said carriage for lifting and closing each of said doors of each oven in succession, means of removing the cores and molds from said ovens, means of removing said cores from said molds, means of inverting said molds, means of separating said molds to permit the molded articles to gravitate therefrom, means of closing said molds, means of reverting said molds, means of bringing mechanism for recharging said molds with material to be molded into engagement with said molds, means of discharging material to be molded into said molds, means of retreating said mechanism to its initial position, means of inserting said cores into said molds, means of returning said molds and cores into the ovens, whereby molded articles are made.

13. In combination, a plurality of ovens, a door to each oven, a molding device in each oven consisting of a plurality of molds and a plurality of cores, carriage mechanism adapted to be brought adjacent each of said ovens successively, means of moving said carriage step by step, means of returning said carriage to its initial position, means on said carriage for lifting and closing each of said doors of each oven in succession, means of removing the cores and molds from said ovens, means of removing said cores from said molds, means of inverting said molds, means of separating said molds to permit the molded articles to gravitate therefrom, means of closing said molds, means of reverting said molds, means of bringing mechanism for recharging said molds with material to be molded into engagement with said molds, means of discharging material to be molded into said molds, means of retreating said mechanism to its initial position, means of inserting said cores into said molds, means of returning said molds and cores into the ovens, and means of inverting said cores and molds in said oven a predetermined time after being inserted therein, and means of reverting said molds and cores prior to the removal of them from said ovens by the mechanism on said carriage, whereby molded articles are made.

14. In combination, a plurality of ovens, a door for each oven, a carriage adapted to co-operate with each of said ovens successively, means of transporting said carriage, means of moving it step by step for each oven, means of returning said carriage to its initial position, molding devices in each of said ovens consisting of a plurality of molds and a plurality of cores therefor, means on said carriage for opening the door of each of said ovens, means on said carriage for withdrawing said molds and cores out of each of said ovens in succession, means of lifting the cores out of said molds, means of supporting said molds on said carriage, means of lifting said molds on said carriage above said supporting means, means of spreading said supporting means, means of inverting said molds on said carriage, means of spreading said molds on said carriage to permit of the gravitation therefrom of the molded articles, means of conveying away said molded articles, means of reverting said molds to their closed position while on said carriage, means of drawing together said supporting means for said molds, means of lowering the lifting means for said molds so that said molds will be supported on said supporting means, means of supplying material to be molded for said molds, means of bringing said material supplying means in proximity to said molds, means of ejecting said molded material into said molds, means of retreating said material supplying means to its initial position, means of inserting said cores in said mold, means of inserting said molds and cores into said oven, means of closing the door of said oven and lifting the door of the next oven in succession while the carriage is being moved into proximity with the succeeding oven, means of inverting the molds and cores while in said oven, means of reverting said molds of said cores in said oven prior to lifting the door thereof and the removal of the molding devices therefrom, whereby molded articles are made.

15. In a method of molding articles, moving a carriage mechanism before a plurality of ovens in succession step by step, opening the door of each oven in succession, extracting molding devices from each of said ovens in succession, unloading molded articles from said molding devices, re-charging said molding devices, returning each of said molding devices to its oven, closing the door of said oven and returning said serving apparatus on the carriage to its initial position after it has served each of the ovens in succession.

16. In a method of molding articles, moving a supporting carriage mechanism in proximity with a series of ovens in succession, opening each of said ovens in succession when said carriage device is adjacent thereto, extracting molded devices therefrom, unloading the molded article from said molding devices, loading said molding devices, returning said molding devices to said oven, closing the door of said oven, inverting said molding devices in said oven, reverting the inverted molding devices in the next succeeding oven, returning said carriage supporting mechanism to its initial position when each of said ovens and molding devices have been successively operated.

17. In a method of molding articles, moving a supporting mechanism adjacent a plurality of ovens in succession, opening the door of each of said ovens in succession, withdrawing molding devices therefrom consisting of cores and molds, removing the cores from said molding devices, inverting and discharging molded articles from said molds by the separating of said molds, bringing said molds together and reverting, loading said molds by bringing a loading mechanism in proximity thereto, withdrawing said loading mechanism therefrom after having loaded said molds, reinserting said cores in said molds, returning said molds and cores into said oven, closing the door of said oven, inverting said molding devices in said oven moving the carriage to the next oven, reverting molding devices therein to their upright position, returning said carriage mechanism to its initial position after having co-operated with each of said ovens and molding devices therein in succession, whereby molded articles are produced.

18. In combination, molding means, baking means, reciprocating means, a loading means carried thereby, an unloading means carried on said reciprocating means, and means for moving said molding means on and off said reciprocating means and in and out of said baking means.

19. In combination, molding means, baking means, reciprocating means, a loading means carried thereby, an unloading means carried on said reciprocating means, means for moving said molding means on and off said reciprocating means and in and out of said baking means, and means to move the reciprocating means step by step in one direction and return it to its initial position.

20. In combination, a baking means, molding devices normally contained therein, a reciprocating carriage adapted to be moved adjacent each of said molding devices in turn, loading means for said molding devices carried on said carriage, loading means to remove the molded articles from said molding devices, means to move said carriage step by step adjacent to each of said molding devices in succession, means to return said carriage to its initial position, and means to insert and withdraw said molding devices in said oven at stated intervals, whereby articles are molded.

21. In combination, an oven, molding devices normally contained therein, a reciprocating carriage adapted to be moved adjacent each of said molding devices contained in said oven, loading means for said molding devices carried on said carriage, unloading means to remove the molded articles from said molding devices, means to move said carriage step by step adjacent to each of said ovens in succession, means to return said carriage to its initial position, means to insert and withdraw said molding devices in said oven at stated intervals, and means to insert and revert said molding devices while in said oven, whereby articles are molded.

22. In combiation, an oven, molding devices normally contained therein, a reciprocating carriage adapted to be moved adjacent each of said molding devices contained in said oven, loading means for said molding devices carried on said carriage, means to move said carriage step by step adjacent to each of said molding devices in succession in said oven, means to return said carriage to its initial position, means to insert and withdraw said molding devices in said oven at stated intervals, means to invert and revert said molding devices while in said oven and means to invert and revert said molding devices while on said carriage, whereby articles are molded.

23. In combination, an oven, molding devices normally contained therein, a reciprocating carriage adapted to be moved adjacent each of said molding devices contained in said oven, loading means for said molding devices carried on said carriage, means to move said carriage step by step adjacent to each of said molding devices in succession in said oven, means to return said carriage to its initial position, means to insert and withdraw said molding devices in said oven at stated intervals, means to invert and revert said molding devices while in said oven and means to invert and revert said molding devices while on said carriage, a plurality of doors on the face of said oven and means to open and close the doors of said ovens, whereby articles are molded.

24. In combination, an oven, a plurality of molding devices therein, carriage mechanism adapted to co-operate with each of said molding devices in succession, doors adjacent each of said molding devices, said doors being mounted on said oven, means on said carriage for opening each of said doors and closing said doors, means for removing each of the molding devices from said oven onto said carriage and returning said molding devices to said oven, means of removing molded articles from said molding devices while on said carriage and means of re-filling said molding devices while on said carriage, whereby molded articles are made.

In testimony whereof, we affix our signatures.

WEBSTER M. ROBERTS.
GEORGE W. HINTON.